United States Patent [19]

Renlund et al.

[11] Patent Number: 5,041,248

[45] Date of Patent: Aug. 20, 1991

[54] PROCESS FOR MAKING FINE DIAMETER CERAMIC FIBERS USING A MOLDABLE CERAMIC COMPOSITION

[75] Inventors: Gary M. Renlund, Scotia; Curtis A. Johnson, Schenectady, both of N.Y.

[73] Assignee: General Electric Company, Schenectady, N.Y.

[21] Appl. No.: 647,213

[22] Filed: Jan. 28, 1991

Related U.S. Application Data

[63] Continuation of Ser. No. 414,229, Sep. 29, 1989, abandoned.

[51] Int. Cl.$^5$ .................... B29C 47/88; C04B 35/80
[52] U.S. Cl. ........................ 264/44; 264/59;
264/63; 264/210.6; 264/210.7; 264/210.8;
264/211.17; 264/211.15; 264/235.6; 264/346
[58] Field of Search ............ 264/44, 56, 59, 63,
264/210.6, 210.7, 210.8, 211.15, 211.17, 235.6,
346

[56] References Cited

U.S. PATENT DOCUMENTS

| | | | |
|---|---|---|---|
| 3,112,184 | 11/1963 | Hollenbach | 264/63 |
| 3,384,154 | 5/1968 | Milton | 165/1 |
| 3,753,757 | 8/1973 | Rodgers et al. | 117/22 |
| 4,004,934 | 1/1977 | Prochazka | 106/44 |
| 4,017,319 | 4/1977 | Grossnovich | 501/97 |
| 4,041,117 | 8/1977 | Prochazka | 264/63 |
| 4,119,475 | 10/1978 | Prochazka | 501/97 |
| 4,175,153 | 11/1979 | Dobo et al. | 264/63 |
| 4,225,356 | 8/1980 | Prochazka | 501/97 |
| 4,530,808 | 7/1985 | Renlund et al. | 264/63 |
| 4,551,496 | 11/1985 | Renlund et al. | 524/322 |
| 4,571,414 | 2/1986 | Renlund et al. | 524/322 |

FOREIGN PATENT DOCUMENTS

| | | | |
|---|---|---|---|
| 180957 | 2/1984 | Japan | 264/63 |
| 966945 | 8/1964 | United Kingdom | 264/63 |

OTHER PUBLICATIONS

"Vistanex ® Polyisobutylene Properties and Applications", Sales brochure Exxon Chemicals, copyright 1974.

*Primary Examiner*—Jan H. Silbaugh
*Assistant Examiner*—Brian Jones
*Attorney, Agent, or Firm*—James E. McGinness; James C. Davis, Jr.; James Magee, Jr.

[57] ABSTRACT

A thermoplastic ceramic molding composition comprised of about 40 to 70 volume percent of a binder, consisting essentially of an organic acid containing from 12 to 26 carbon atoms per molecule and a polyisobutylene polymer having a molecular weight between about 8,700 and 135,000, and about 30 to 60 volume percent of a ceramic powder is disclosed. The molding composition can be thermoplastically extruded into elongate ceramic bodies that can be uniformly elongated many times the original length of the ceramic body to form, for example, very fine diameter fibers or filaments suitable for sintering into a polycrystalline ceramic fiber or filament having a very fine diameter.

3 Claims, No Drawings

PROCESS FOR MAKING FINE DIAMETER CERAMIC FIBERS USING A MOLDABLE CERAMIC COMPOSITION This application is a Continuation of application Ser. No. 07/414,229, filed Sept. 29, 1989, and now abandoned.

The present invention is directed to thermoplastic extrusion of a ceramic particulate composition. More particularly, it relates to a thermoplastic binder for thermoplastically extruding a ceramic particulate material into a fiber.

BACKGROUND OF THE INVENTION

Thermoplastic molding techniques for ceramic powders include, for example, injection molding, blow molding, compression molding, transfer molding, drawing, rolling and extrusion. In thermoplastic ceramic extrusion, a heated mixture of a ceramic powder and a thermoplastic binder are forced through a die to form shapes like bars, rods, tubing or fibers. The thermoplastic binder must be suitable as a vehicle for the ceramic powder, maintain the extruded shape, and be easily removed from the extruded shape, leaving behind a shaped powder compact. Binder removal is normally done by thermal decomposition. After binder removal, the shaped compact is baked to sinter the ceramic powder into a densified body. The ceramic powder and thermoplastic binder mixture are herein referred to as a thermoplastic ceramic molding composition.

A major problem with the binder for thermoplastic ceramic molding compositions has been that thermal decomposition of the binder, from the shaped powder compact, generally introduces defects, such as cracks, pits and voids into the sintered body. U.S. Pat. Nos. 4,571,414 and 4,551,496 disclose a thermoplastic ceramic molding composition of a sinterable ceramic powder mixed with an organic acid and a thermoplastic co-polymer of ethylene and vinyl acetate. The thermoplastic binder of the '414 and '496 patents can be formed by the techniques described above to form polycrystalline ceramic articles such as gas turbine air foils, crucibles, thin-walled hollow tubes, long rods, spherical bodies and nozzles. The binder can be removed by thermal decomposition without leaving service-limiting cracks, voids or other defects in the ceramic body.

Ceramic fibers are increasingly being utilized in ceramic composites and metal matrix composites to increase toughness, strength, thermal shock resistance, impact resistance, and other desirable properties in the composite. In some instances, very fine diameter continuous ceramic fibers or filaments will theoretically provide a greater increase in the strength, toughness or other desirable properties in such composites. As the diameter of a ceramic fiber decreases it becomes increasingly difficult to thermoplastically extrude so that, as a practical matter, thermoplastic extrusion can be used to form ceramic fibers as small as about 250 microns in diameter.

Heretofore, ceramic whiskers have effectively been utilized to provide improvements in the strength and toughness of various composite bodies. Ceramic whiskers are very fine diameter single crystal filaments as fine as 0.1 micron in diameter and are characterized further by a very small size, typically about 10–100 microns in length.

Single crystal or polycrystalline continuous ceramic fibers or filaments having a very fine diameter can provide further improvements in the strength, toughness, volume fraction of fiber loading, fiber alignment and other desirable properties as well as provide improvements in the manufacturing processes for both the composites and fibers. However, at the present time, a very limited number of processes for making specific ceramic materials into very fine diameter ceramic fibers or filaments are known. For example, single crystal sapphire filaments have been grown from an alumina melt by slowly drawing a filament from the melt.

Therefore, it is an object of this invention to provide a binder system suitable for fabrication of a wide range of continuous ceramic fibers, and very fine diameter continuous ceramic fibers or filaments. As used herein, a continuous fiber does not necessarily refer to an infinite length but rather a length of fiber suitable for use in a variety of manufactured articles such as a composite.

It is also an object of this invention to provide a thermoplastic ceramic molding composition suitable for extrusion into elongate ceramic bodies and containing a binder that can be substantially removed from the ceramic body by thermal decomposition of the binder to provide a sintered ceramic body essentially free of the cracks, pits or voids sometimes formed by the decomposition of binders.

Another object is an extrusion process for forming continuous elongate ceramic bodies.

A further object is a process for forming fine diameter continuous ceramic fibers or filaments that have a finer diameter than can be produced by thermoplastic ceramic extrusion alone.

An additional object is an elongate ceramic body formed from the thermoplastic ceramic molding composition, that can be uniformly elongated until the cross-section of the ceramic body is reduced to as small as 25 microns.

BRIEF DESCRIPTION OF THE INVENTION

A thermoplastic ceramic molding composition that can be extruded into an elongate ceramic body, heated to remove a binder for the ceramic without forming defects in the elongate ceramic body, and a ceramic that can be formed into very fine diameter continuous ceramic fibers is provided. An extrusion process and a process for forming continuous fine diameter fibers or filaments from the thermoplastic ceramic molding composition are also provided. The thermoplastic ceramic molding composition of this invention is particularly suited for the manufacture of smaller cross-section articles such as fibers and was found to be unsuitable for larger cross-section articles such as gas turbine air foils.

The thermoplastic ceramic molding composition is comprised of a densifiable ceramic particulate material having an average particle size of less than about 10 microns that is homogeneously dispersed in a thermoplastic binder. The thermoplastic binder is about 40 percent by volume to about 70 percent by volume of the molding composition, and consists essentially of an organic acid containing from 12 to 26 carbon atoms per molecule and having a melting point ranging from about 44° C. to about 88° C. and a polyisobutylene polymer, the organic acid comprising about 20 to 50 weight percent of the binder. Polyisobutylene polymers suitable for use in the present binder are highly paraffinic hydrocarbon polymers ranging from very viscous liquids having a Staudinger average molecular weight as low as 8,700 up to tough rubbery solids with average molecular weights as high as 135,000. The transition between viscous liquid and rubbery solid occurs in the average molecular weight range of about 15,000 to 30,000. Preferably, the polyisobutylene polymer used in the present binder has a Staudinger average molecular weight between 64,000 and 117,000. However, the present binder can be made from any of the polyisobutylene polymers having an average molecular weight between about 8,700 to 135,000 or blends thereof. The densifiable ceramic particulate material is about 30 percent by volume to about 60 percent by volume of the molding composition.

Optionally, small additions of polymers and solvents that do not impair the desirable thermal decomposition and drawing properties of the binder can be added to the polyisobutylene polymer up to about 20 weight percent of the polyisobutylene. Additions can be made of polymers that are soluble in the polyisobutylene up to about 20 weight percent and that do not seriously deleteriously affect the thermal decomposition of the polyisobutylene, such as isoprene, ethylene, vinyl acetate, polyethelene, polyethelene vinyl acetate or mixtures thereof; and nonpolar hydrocarbon solvents, aliphatic hydrocarbons, carbon disulfide and halogenated solvents that the polyisobutylene polymer is soluble in, including paraffins such as N-Hexane or kerosene, olefins and napthenes such as diisobutylene or cyclohexane; aromatics such as benzene, toluene or xylene; chlorinated hydrocarbons, such as carbon tetrachloride or trichloroethylene; or alcohols, ethers and esters such as heptadecanol, butyl acetate or methyl oleate, or mixtures thereof.

Another embodiment of the present invention comprises a process for thermoplastically molding the ceramic molding composition to form continuous elongate ceramic bodies or fibers. The thermoplastic ceramic molding composition described above is heated to at least a temperature where the molding composition, under pressure, will at least flow through the extrusion die but not above the temperature where the binder begins to degrade. Such temperatures are between about 70° C. to 150° C. The heated molding composition is thermoplastically extruded to form an elongate ceramic body.

The extruded elongate ceramic body is then heated or baked to decompose the binder. Decomposition is accomplished by heating the ceramic body to a temperature that causes substantially complete decomposition of the binder at a heating rate that allows the decomposition products to diffuse from the ceramic body without forming voids or other defects in the ceramic body. Decomposition is performed in an atmosphere that removes the decomposition products without reacting with the ceramic powder. Depending upon the particular ceramic composition, such atmospheres as air, hydrogen, helium, argon or a vacuum can be used. The baked ceramic body is then sintered to densify the ceramic particles forming an elongate ceramic body having up to 20 percent porosity. For structural applications, the elongate ceramic body is preferably sintered to densify the ceramic particles forming an elongate ceramic body having up to 10 percent porosity.

In another embodiment of the present invention, the thermoplastic molding compound is extruded into a fiber and formed into fine diameter filaments. A method for forming fine diameter filaments was developed as a result of the surprising discovery that the extrudate can be uniformly elongated or drawn. The extruded molding compound can be elongated or drawn immediately after extrusion, while the molding compound is heated, or after it has cooled to room temperature. Drawing causes the fiber to elongate with a corresponding reduction in the diameter of the fiber. The elongation may initially be localized to small areas of the fiber, however, continued drawing causes the fiber to uniformly elongate so the cross section of the fiber is reduced to a substantially uniform diameter along the entire length of the fiber. Immediately after the fiber has been drawn, some springback may occur, causing an increase in the diameter and decrease in the length of the drawn fiber up to about 30 percent of the as drawn diameter and length.

The extruded thermoplastic molding compound can be drawn to uniformly elongate the fiber up to about three times the fibers original length without introducing substantial defects into the fiber or breaking the fiber. A relaxation anneal can be performed, after drawing, that returns the molding compound to its former plasticity. Relaxation anneals can be performed at room temperature for about 24 hours or elevated temperatures that are below the decomposition temperature of the binder for shorter time periods. After the relaxation anneal, the molding compound can be uniformly elongated substantially to the same extent as the initially extruded fiber. Drawing and subsequent annealing can be repeated many times to form fine diameter filaments as fine as 25 microns in diameter or finer. The extent of fiber elongation and the resulting reduction in diameter or cross-section of the fiber is limited by the ceramic particle size in the molding composition. It is desirable to have a minimum number of particles across the cross-section of the fiber so that a sintered fiber can be formed. Therefore the elongation of the molding composition is limited by the final cross-section of the ceramic body to provide a sinterable amount of ceramic particles in the ceramic body, although the ceramic body can be elongated further. Relaxation annealing may cause some recovery in the fiber so that the diameter may increase and the length decrease as much as 10 percent of the diameter and length of the fiber immediately before the relaxation anneal. The drawn fiber is baked to thermally decompose the binder and sinter the ceramic powder as described above.

In a similar manner, small diameter ceramic tubing can be formed by extruding the thermoplastic molding compound into an elongate ceramic body having a tubular form, and drawing the body according to the drawing and relaxation annealing processes described above.

DETAILED DESCRIPTION OF THE INVENTION

A thermoplastic ceramic molding composition and process are disclosed for extruding ceramic powders into elongate ceramic bodies that are baked to remove a thermoplastic binder and sinter the remaining ceramic particles into a polycrystalline ceramic body. In another embodiment, the thermoplastic ceramic molding compound is extruded to form fibers that are drawn into fine diameter filaments. The thermoplastic binder can be thermally decomposed from smaller cross-section articles such as fibers, tubes or rods without leaving voids or other defects in the sintered ceramic body.

In the present invention, the thermoplastic ceramic molding composition is comprised of a uniform or substantially uniform mixture, e.g. a homogeneous or substantially homogeneous dispersion, of the ceramic powder and binder. More specifically, the moldable ceramic composition contains the ceramic powder as a homogeneous or substantially homogeneous dispersion.

The present binder is a thermoplastic material which exhibits a very high viscosity at room temperature, and as a practical matter, can be considered a solid at room temperature. Binder viscosity decreases with increasing temperature. The binder is comprised of an organic acid and a polyisobutylene polymer preferably having a Staudinger average molecular weight ranging from 64,000 to 117,000. However, lower average molecular weight polyisobutylene polymers as low as 8,700 or higher average molecular weight polyisobutylene polymers as high as 135,000 or blends thereof, can be used for the present polyisobutylene polymer. The lower molecular weight polyisobutylene polymers having an average molecular weight of about 8,700 to 30,000 will form binders that extrude easily but the extrudate does not draw as well as extrudates formed from binders comprised of the preferred polyisobutylene polymers having a molecular weight of about 64,000 to 117,000. The higher molecular weight polyisobutylene polymers having an average molecular weight between about 118,000 to 135,000 will form binders that are more difficult to extrude and the extrudate does not draw as well as the extrudates made from binders comprised of the preferred polyisobutylene polymers identified above.

An example of a commercially available polyisobutylene polymer suitable for use in the present binder is sold under the trade name "Vistanex". The polyisobutylene polymer comprises about 50 percent to 80 percent by weight of the binder. Preferably, the polyisobutylene polymer comprises about 70 percent by weight of the binder.

Optionally, small additions of polymers and solvents that do not impair the desirable thermal decomposition and drawing properties of the binder can be added to the polyisobutylene polymer up to about 20 weight percent of the polyisobutylene. Additions can be made of polymers that are soluble in the polyisobutylene up to about 20 weight percent and can be thermally decomposed without significantly deleteriously affecting the sintered ceramic body, such as isoprene, ethylene, vinyl acetate, polyethelene, polyethelene vinyl acetate or mixtures thereof; and nonpolar hydrocarbon solvents, aliphatic hydrocarbons, carbon disulfide and halogenated solvents that the polyisobutylene polymer is soluble in including paraffins such as N-Hexane or kerosene, olefins and napthenes such as diisobutylene or cyclohexane; aromatics such as benzene, toluene or xylene; chlorinated hydrocarbons, such as carbon tetrachloride or trichloroethylene; or alcohols, ethers and esters such as heptadecanol, butyl acetate or methyl oleate, or mixtures thereof. For example, a preferred addition is toluene in amounts up to about 20 weight percent of the polyisobutylene. Such toluene additions are imbibed into the polyisobutylene and improve the drawing characteristics of the binder allowing greater elongation of extrudates such as fibers with less springback in the drawn extrudate.

The present organic acid contains from 12 carbon atoms to 26 carbon atoms per molecule, and has a melting point ranging from about 44° C. to about 88° C. Preferably, the organic acid is selected from the group consisting of lauric acid (melting point −44° C.), stearic acid (melting point −70° C.), cerotic acid (melting point −88° C.), palmitic acid (melting point −63° C.), and mixtures thereof, and most preferably, it is stearic acid. Most commercial stearic acid is a mixture of palmitic acid, stearic acid and oleic acid, and is suitable for use in the present invention; however, in the examples provided below, a reagent grade stearic acid of approximately 95 percent purity was used.

The present organic acid allows the binder during bake-out to be thermally decomposed in a reasonable time without sacrificing the beneficial molding properties of the polymer. The useful range of the present organic acid is about 20 to 50 percent by weight of the total binder. Decreasing amounts of the organic acid below about 20 percent by weight of the binder cause the binder to behave increasingly like the polyisobutylene polymer alone, i.e., it was found that the polyisobutylene polymer by itself would not thermally decompose during bake-out without leaving defects in the powder compact. On the other hand, increasing amounts of organic acid above about 50 percent by weight of the binder cause the binder to behave in an increasingly brittle manner, and is apt to leave or will leave service limiting defects consistent with low molecular weight binders. Preferably, the present organic acid is used in an amount ranging from about 25 percent to about 35 percent by weight of the binder, and most preferably about 30 percent by weight of the binder.

The present ceramic powder is a densifiable powder, i.e., it can be densified to produce the present polycrystalline ceramic body. More specifically, the present ceramic powder is a particulate ceramic material which, when formed into the present baked body, can be densified with or without the application of mechanical pressure to produce a polycrystalline ceramic body having a porosity of less than about 20 percent by volume. Examples of such densification of the present baked body include sintering or firing the baked body in a vacuum or gaseous atmosphere, reaction bonding of the baked body, or hot isostatic pressing of the baked body with a gas.

The present ceramic powder can be, for example, a sinterable silicon carbide powder, a sinterable silicon nitride powder, a sinterable mullite, a sinterable aluminum nitride powder, a sinterable alumina powder, or other suitable sinterable ceramic oxides. A sinterable silicon carbide powder is comprised of, for example, silicon carbide and a suitable sintering additive, such as a combination of boron and free carbon. A sinterable silicon nitride powder is comprised of, for example, silicon nitride and a suitable sintering additive such as magnesium oxide. A sinterable mullite powder may or may not contain a sintering additive. A sinterable aluminum nitride powder is comprised of, for example, aluminum nitride and a suitable sintering additive such as $Y_2O_3$ or calcium oxide. A sinterable alumina powder may or may not contain a sintering additive, but a useful sintering additive is magnesium oxide. Generally, a sinterable ceramic powder contains sintering additive up to about 5 percent by weight of the powder. Firing or sintering of the present baked body of sinterable ceramic powder is carried out at an elevated temperature in a vacuum or gas which has no significant deleterious effect thereon to produce the present polycrystalline body.

Useful examples of the present ceramic powder, and the present densification to produce the present polycrystalline ceramic body are disclosed in U.S. Pat. Nos. 4,004,934; 4,041,117; 4,119,475; 4,225,356 and 4,017,319, all of which are assigned to the assignee hereof and all of which are incorporated herein by reference.

U.S. Pat. Nos. 4,004,934 and 4,041,117 to Prochazka disclose a sinterable ceramic, i.e. silicon carbide, powder comprised of silicon carbide and additives of boron and carbon, and sintering a body thereof at about or below atmospheric pressure producing a polycrystalline silicon carbide body with a porosity of less than about 20 percent by volume.

U.S. Pat. No. 4,119,475 to Prochazka et al discloses a sinterable ceramic, i.e. silicon nitride, powder comprised of silicon nitride and a combination of beryllium and magnesium sintering additives, and sintering a body thereof at from about 1800° C. to about 2200° C. under a superatmospheric pressure of nitrogen producing a polycrystalline silicon nitride body with a porosity of less than about 20 percent by volume.

U.S. Pat. No. 4,225,356 to Prochazka et al discloses a sinterable ceramic powder comprised of silicon nitride and beryllium sintering additive, and sintering a body thereof at from about 1900° C. to about 2200° C. under a superatmospheric pressure of nitrogen producing a polycrystalline silicon nitride body with a porosity of less than about 20 percent by volume.

U.S. Pat. No. 4,017,319 to Greskovich et al discloses a ceramic powder for reaction bonding comprised of silicon containing a boron additive, sintering a body thereof to a density ranging from 65 percent to 75 percent, and nitriding the sintered body by reacting it in a gaseous nitrogen atmosphere from 1100° C. to below the melting point of silicon producing a polycrystalline body with a porosity of less than about 20 percent by volume.

An example of reaction bonding densification comprises forming a ceramic powder comprised of about equivalent amounts of silicon carbide and free carbon, infiltrating a body thereof with silicon liquid or vapor and reacting the carbon and silicon producing a polycrystalline body with a porosity of less than 20 percent by volume and generally comprised of about 85 percent silicon carbide with the balance free silicon. Generally, reaction bonding comprises contacting the present shaped baked body at an elevated temperature with a liquid or gas with which it reacts thereby densifying and producing the present polycrystalline body.

Sintering can be further aided by hot isostatic pressing. To carry out the hot isostatic pressing, the present baked body is made gas impermeable and then it is hot isostatically pressed with a gas at superatmospheric pressure and at an elevated temperature which has no significantly deleterious effect on it to produce a polycrystalline body having a porosity of less than 20 percent by volume. The particular gas pressure depends largely on the density desired in the final product, and the particular temperature depends largely on the composition of the body and should have no significant deleterious effect thereon. Generally, isostatic pressing is carried out at a pressure ranging from about 5 MPa to about 100 MPa at a temperature ranging from about 1400° C. to about 2200° C. The hot isostatic pressing gas should have no significant deleterious effect on the body and examples of useful gases are argon, helium, nitrogen and mixtures thereof.

The present baked body can be treated to make it gas impermeable by a number of techniques depending largely on its composition. It may, for example, be sintered only sufficiently to close off its surface pores, making it gas impermeable. A specific example comprises firing the present baked body comprised of mullite in oxygen at from about 1500° C. to 1675° C. at ambient pressure closing off its surface pores, and hot isostatic pressing the resulting gas impermeable body with argon at a pressure of about 10,000 psi at a temperature ranging from 1500° C. to about 1700° C. producing the present polycrystalline body having a porosity of less than about 20 percent by volume.

The present baked body may also, for example, be provided with a coating of a material which makes it gas impermeable but which has no significantly deleterious effect on it. For example, the present baked body is coated completely with a slurry of small glass spheres, heated in a vacuum to a temperature which melts the glass but which is below the sintering, bonding or decomposition temperature of the ceramic powder producing a gas impermeable glass coating and enveloping the body and hot isostatic pressing the coated body with a gas. A specific example comprises coating the present baked body comprised of silicon nitride and suitable sintering additive such as $Y_2O_3$, $Al_2O_3$ or MgO with a slurry of glass spheres, heating the coated body in a vacuum below the decomposition temperature of the silicon nitride melting the glass enveloping the body with glass coating and hot isostatic pressing the resulting gas impermeable coated body with nitrogen gas at a pressure of about 15 MPa and a temperature ranging from about 1600° C. to about 2000° C.

The average size of the present ceramic powder ranges up to about 10 microns and depends largely on the desired final size of the ceramic body and the particular densification techniques used. Larger particle sizes can be used in reaction bonding whereas smaller particle sizes would be used in sintering a compact thereof. In extruded fibers, the molding compositions made from smaller particle sizes can be drawn into finer diameter filaments. Preferably, however, the ceramic powder has an average particle size which is submicron and most preferably, it has an average particle size ranging from about 0.05 micron up to about 1 micron.

The binder is intimately mixed with the ceramic powder in a ratio that maintains the thermoplastic behavior of the binder but contains enough powder to form a self-supporting powder compact free of significant defect once the binder is removed. The thermoplastically moldable ceramic composition is comprised of from about 30 percent by volume to about 60 percent by volume, preferably about 35 to 50 percent by volume, and most preferably about 50 percent by volume, of solids, i.e. the ceramic powder composition, and the balance is the present binder. An amount of solids less than about 30 percent by volume or higher than about 60 percent by volume is not operable to produce the present densified polycrystalline body without significant defect.

The ceramic powder and the present binder are mixed to produce a homogeneous dispersion of the components. Preferably, the ceramic powder and the binder are mixed at temperatures at which the present binder is molten but below the decomposition temperature of the binder, preferably at temperatures ranging from about 70° C. to about 90° C. The polyisobutylene is heated and placed in a kneading type mixer, with the stearic acid or other additives being slowly added to the polyisobutylene. Kneading type mixers are high shear force mixers having mixing arms such as rollers, cams, banbury or sigma blades. In one method, the stearic acid is first dissolved in an excess of toluene and the ceramic powder is mixed therein until uniformly distributed. The toluene is allowed to evaporate and the stearic acid remains as a coating on the ceramic powder particles. The polyisobutylene is placed in a kneading type mixer and heated to about 70° to 90° C. The coated ceramic particles are slowly added to the mixing polyisobutylene until homogeneously dispersed therein. Preferably, the resulting ceramic mixture is broken up into pieces to produce a more useful feed material.

The thermoplastic molding technique used in the method of this invention is extrusion. Sufficient heat and pressure are applied to the ceramic composition to force it to flow through an extrusion die at a predetermined shear rate. The ceramic composition is heated to a temperature at which the binder is less viscous or effectively molten. Generally, the present ceramic composition is heated to make the binder molten at from about 80° C. to about 200° C., and is shaped under a pressure ranging from about 5 MPa to about 100 MPa, depending upon the particular extrusion die and temperature being used. As the extrusion temperature decreases or as the cross-section of the extrusion dies become smaller, higher pressures are required. Depending upon the type of extrusion apparatus—for example, continuous screw extruders—excessive shear rates can be produced that will degrade the polymer, and such excessive shear rates must be avoided. After extrusion, the molded ceramic body is allowed to cool and harden.

The resulting molded body is baked to remove the binder, leaving no significant amount thereof, i.e., leaving no amount of binder which would have a significantly deleterious effect during the densification of the body or on the resulting densified body. Generally, the present baking of the molded body leaves the binder in an amount of less than about 2 percent by weight, and preferably less than about one percent by weight of the baked body.

The molded body is baked at a heating rate or on a time-temperature schedule, which removes the binder without imparting significant defect to the body up to a temperature of about 400° C. During baking, the binder evaporates or thermally decomposes and is removed predominantly as a vapor. The baking should not introduce any significant defect, i.e., any service-limiting defect, such as, for example, cracks, voids and pits to the resulting baked or sintered body. Baking of the molded body is carried out under a vacuum or in an atmosphere which has no significant deleterious effect thereon.

The allowable average heating rate or schedule to remove binder to produce parts without serious defect is dependent on the size, shape and especially the maximum cross-sectional thickness of the molded part as well as the size, shape, state of agglomeration and volume fraction of the ceramic powder. Faster average heating rates are acceptable for thinner cross-sections, and slower average heating rates are necessary for thicker cross-sectional thicknesses. More specifically, the average heating rate to remove binder is inversely proportional or substantially inversely proportional to the maximum cross-sectional thickness of the molded piece. Therefore, for the range of useful products of commercial interest, the average heating rate to remove binder can range from about 1° C. per hour up to about 1000° C. per hour.

If desired, the baked body can be additionally heated to impart additional mechanical strength thereto. Such strength-imparting heating should have no significant deleterious effect on the body. Such strength-imparting heating can be carried out at a temperature below the sintering temperature of the ceramics.

The present polycrystalline ceramic body has a porosity less than about 20 percent by volume, preferably less than about 10 percent by volume, and most preferably less than about 5 percent by volume of the total volume of the densified body. Porosity is the percent by volume of the densified body occupied by voids, i.e. pores, and can be determined by liquid displacement and/or metalligraphic procedures. The pores are distributed throughout the body.

Although not necessary in the present invention, the ceramic body may be imbedded or immersed in a supporting powder, which helps to prevent significant distortion of the body during baking to remove the binder. The imbedding powder should be chemically compatible with the molded body, i.e., it should have no significant deleterious effect on the body. An example of a suitable embedding powder is charcoal. Preferably, the embedding powder is spherical or nominally spherical, and preferably has an average diameter ranging from about 10 microns to about 1,000 microns. Representative of embedding powders useful for molded bodies of silicon carbide and silicon nitride are charcoal, sintered polycrystalline silicon carbide having a density greater than 80 percent of the theoretical density of silicon carbide, amorphous or crystalline-free carbon-coated sintered polycrystalline silicon carbide, wherein said carbon has a density greater than 80 percent of the theoretical density of graphite and wherein said polycrystalline silicon carbide has a density greater than 80 percent of the theoretical density of silicon carbide, amorphous or crystalline-free carbon having a density greater than 80 percent of the theoretical density of graphite and mixtures thereof. For chemical compatibility reasons, silicon nitride powder would be particularly preferred as an embedding powder for a molded body of silicon nitride. With respect to a molded body of mullite, an embedding powder of $Al_2O_3$ or $SiO_2$ is useful, but an embedding powder of mullite would be preferred.

Another method of supporting the ceramic body during baking for binder removal and sintering is to place the ceramic bodies on grooved plates that are made from a material that does not chemically react with the ceramic body. For example, extruded fibers can be placed on a plate containing grooves slightly larger than the fibers to minimize distortion, warping or curling of the fibers during baking.

The invention is further shown by the following examples. The polyisobutylene polymer used in the examples below has a Staudinger average molecular weight of about 81,000 to 99,000 and is sold under the trademark "Vistanex MM L-100" by the Exxon corporation.

EXAMPLE 1

A thermoplastic ceramic molding composition comprised of 95 grams alumina powder, 15.4 grams polyisobutylene, and 6.6 grams stearic acid was prepared. The alumina powder was about 50 volume percent of the molding composition. First, the stearic acid was dissolved in toluene and the alumina powder was mixed into the dissolved stearic acid. The toluene was allowed to evaporate, leaving behind the powdered alumina coated with stearic acid. The polyisobutylene was placed in a 60 cubic centimeter brabender mixing bowl with roller blades turning at about 10 to 20 rpm, and heated to about 70° C. The alumina powder coated with stearic acid was slowly added to the Vistanex in the mixer, until the molding compound reached a uniform consistency so that the powder was homogeneously dispersed within the binder. The molding compound was then removed from the mixer and chopped into small pieces. A second batch of molding compound was prepared by using the same mixing procedure as outlined above.

The molding composition was then extruded into a continuous ceramic fiber in a Haake ¾ inch, 25:1 length to diameter ratio, screw extruder. The die opening in the extruder was about 250 microns. The molding composition was extruded at 80 to 100° C. at a pressure of 30 to 40 MPa.

After the fiber was extruded, it was elongated up to about 300 percent with a corresponding decrease in diameter from about 250 microns to about 145 microns. Samples of the extruded fiber and extruded and drawn fiber were baked to remove the binder and sintered by heating the fibers to 1550° C. in air. Polycrystalline alumina fibers having less than ten percent porosity were produced with no visible defects from binder removal.

EXAMPLE 2

A thermoplastic ceramic molding composition comprised of 77.7 grams silicon carbide, 15.6 grams polyisobutylene, 6.7 grams stearic acid is prepared. The silicon carbide powder is about 50 volume percent of the molding composition.

The polyisobutylene is first placed in a kneading-type mixer with the roller blades turning at about 10 to 20 rpm and heated to about 70° C. Stearic acid is slowly added to the mixing polyisobutylene until it is thoroughly mixed into the polyisobutylene. The silicon carbide powder is slowly added to the binder mixture until a homogeneous dispersion is formed. The molding compound is then removed from the mixer, chopped into small pieces and extruded into a fiber having a diameter of 250 microns according to the extrusion process described in Example 1.

A silicon carbide plate is machined with grooves having a depth and width slightly larger than the extruded fibers. The extruded fibers are placed in the grooves of the plate and a flat silicon carbide cover plate is placed over the grooved plate to hold the fibers in the grooves. The assembly of plates and fibers is fired to 500° C. at a heating rate of 4° C./minute in a vacuum of about 10 mmHg. With the fibers still in the supporting grooved plates, the fibers are sintered in a graphite resistance furnace, heated in about four hours to 2100° C. and held for 30 minutes. The grooved plate and cover plate support the fibers during binder removal and sintering so that the fiber does not become distorted, warped or curled. Because silicon carbide decomposes at temperatures above 2000° C., an over pressure of silicon carbide decomposition products is provided by using the silicon carbide grooved plate or by placing a small amount of sacrificial silicon carbide powder adjacent to the fibers. This sintering procedure densifies the fibers into polycrystalline silicon carbide fibers having less than 10 percent porosity with no visible defects from the binder removal.

EXAMPLE 3

About 187.2 grams of polyisobutylene was placed in a water jacketed kneading-type mixer having sigma blades. About 200 grams of toluene was added to the polyisobutylene and blended until the toluene was imbibed in the polymer. The temperature of the mixer was raised to about 70° C. by flowing heated water through the jacket of the mixer. Next, about 80.4 grams of stearic acid was fully mixed with the polyisobutylene. About 932.4 grams of a sinterable silicon carbide powder was slowly added to the mixing polyisobutylene and mixed at about 60 rpm for about 20 minutes. An additional ten minutes of mixing was performed with the blend under a vacuum of about 50 mmHg. During the mixing process, some of the toluene evaporated from the blend, but it is believed that the binder contained about 20 percent by weight toluene. The blend was removed from the mixer and chopped for easier handling.

A plunger-type extruder was used to extrude the thermoplastic ceramic molding composition at about 78° C. into rods having a diameter of about 3 millimeters. The rods were placed on ten inch long grooved graphite plates. Binder removal was performed by heating the fibers in a vacuum furnace to 500° C. at a heating rate of 4° C. per minute. After binder removal, the rods were fired at 2100° C. in a graphite furnace.

Some of the extruded rods were drawn by hand stretching the rods to roughly double the length of the rod. During stretching, some of the toluene was liberated from the fibers. After stretching, the fibers were allowed to anneal for about 24 hours at room temperature. Fibers were again drawn to further reduce the diameter. This alternation of drawing and annealing was repeated until the fibers were reduced to a diameter of about 50 microns. The drawn fibers were then heated to remove the binder and sintered by the same firing procedure discussed above. Polycrystalline silicon carbide fibers with no visible defects from binder removal and having less than 20 percent porosity were formed.

What is claimed is:

1. A process for forming a fine diameter elongate ceramic body, comprising:

forming a thermoplastic molding composition comprising from about 30 to 60 volume percent of a ceramic powder and from about 40 to 70 volume percent of a binder comprising about 20 to 50 weight percent of an organic acid having a melting point of from about 44° C. to about 88° C. and containing from 12 to 26 carbon atoms per molecule, and about 50 to 80 percent of an isobutylene polymer having an average molecular weight between about 8,700 and 135,000, the ceramic powder being homogeneously dispersed in the thermoplastic binder to form the thermoplastic ceramic molding composition;

extruding the molding composition at a temperature between about 70° C. to 150° C. to form an elongate ceramic body;

drawing the elongate ceramic body to a uniform elongation;

relaxation annealing the drawn body to restore former plasticity; and repeating the drawing step to form the fine diameter elongate ceramic body.

2. The process of claim 1 before the step of decomposing further comprising the step of supporting the elongate ceramic body.

3. A process for forming a fine diameter elongate ceramic body suitable for densifying into a polycrystalline ceramic body having a porosity of less than about 20 percent by volume of the polycrystalline body, comprising:

forming a thermoplastic molding composition comprising from about 30 to 60 volume percent of a ceramic powder and from about 40 to 70 volume percent of a binder comprising about 20 to 50 weight percent of an organic acid having a melting point of from about 44° C. to about 88° C. and containing from 12 to 26 carbon atoms per molecule, and about 50 to 80 percent of an isobutylene polymer having an average molecular weight between about 8,700 and 135,000, the ceramic powder being homogeneously dispersed in the thermoplastic binder to form the thermoplastic ceramic molding composition;

extruding the molding composition at a temperature between about 70° C. to 150° C. to form an elongate ceramic body;

drawing the elongate ceramic body to a uniform elongation;

relaxation annealing the drawn body to restore former plasticity; and repeating the drawing step to form the fine diameter body; and decomposing the binder by heating the fine diameter body at a rate of heating that does not produce defects in the fine diameter body and heating up to a temperature that substantially removes the binder, leaving no amount therein that would have a significantly deleterious effect on the body.

* * * * *